July 20, 1937. L. STARK 2,087,822
ABSORPTION COOLING MACHINE
Filed March 28, 1935
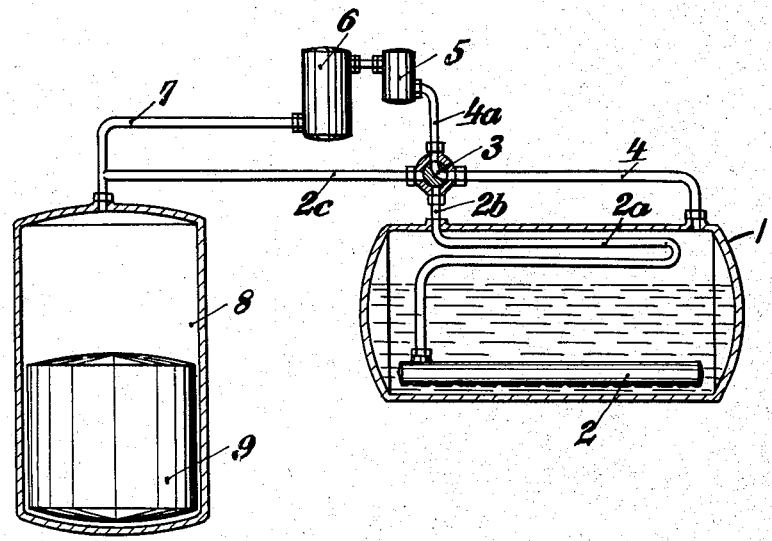
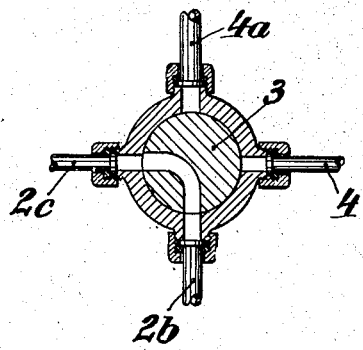

Patented July 20, 1937

2,087,822

UNITED STATES PATENT OFFICE 2,087,822

ABSORPTION COOLING MACHINE

Louis Stark, Vienna, Austria, assignor to Adolf Pollak-Rudin, Vienna, Austria

Application March 28, 1935, Serial No. 13,548
In Austria April 14, 1934

1 Claim. (Cl. 62—118)

This invention relates to a contrivance for improving the efficiency of absorption cooling machines working in phases whose evaporator is designed to act as an irrigation cooler for liquids, for instance milk.

In absorption cooling machines, built into refrigerators or cold storage rooms, it is necessary to extend the cooling period to 24 hours where possible. This period must be shortened to about 1 hour in the case of absorption cooling machines for the refrigeration of liquids by means of irrigation coolers. This reduction of time is rendered feasible only by an adequately rapid absorption of the vapor of the refrigerating medium coupled with a simultaneous diminution of the vapor pressure. This is indeed attainable by enlarging the cooling surface of the absorber or by increasing the quantity of cooling water of a suitably low temperature. When, however, there is an insufficient quantity of cooling water or its temperature is not low enough, it is not possible to complete the cooling phase in the short time, because owing to the great accumulation of heat in the evaporator or irrigation cooler, the vapor pressure rises so rapidly that the boiling point of the refrigerating medium rises to an undesirable extent in proportion to the pressure. This drawback is obviated by the present invention which allows the cold vapors from the evaporator, or irrigation cooler, to pass through the vapor space above the absorption medium in an extended system of pipes before entering the absorption pipe in the boiler absorber. It is thus possible to cool the unabsorbed vapors in the absorber to such a degree that the resultant diminished vapor pressure brings about a constant flow from the evaporator giving a low evaporation temperature.

The invention is illustrated in the drawing by way of example only and Figure 1 is a vertical section through the boiler absorber and evaporator or irrigation cooler during the refrigerating phase.

Fig. 2 is a transverse section and detail view of the control cock during the boiling stage.

In the boiler absorber (1) there is the absorption pipe (2) which forms a coil (2a) in the vapor space of the boiler and after issuing from the boiler is joined by means of a pipe (2b) to the four-way cock (3). Into this cock there also runs a second pipe (4) which during the boiling period, when the cock is set as in Fig. 1, conveys the vapor of the refrigerating medium through the four-way cock, and pipe (4a) into the separator (5), pipe (2b) being closed. From the separator the dried vapor passes into the condenser (6) where it is liquefied and flows through pipe (7) into the evaporator (8) which acts as an irrigation cooler. In this evaporator a cylindrical volume reducer (9) is located in such a manner that a very narrow annular space is formed between its outer surface and the inner wall of the evaporator 8 which is annular in cross section.

At the end of the boiling period the four-way cock is turned 180 degrees, or in the case of an invertible cooling machine is placed in the cooling position. Now through pipe (2c) that connects with the four-way cock, the evaporator (8) is in direct communication with pipe (2b) through which the vapor of the refrigerating medium, formed in the evaporator, flows through coil (2a) into the absorber pipe 2 situated in the boiler absorber 1. The current of cold vapor passing through the coil (2a) cools the warm vapor present in the boiler absorber 1 and diminishes the vapor pressure, thus causing a constant flow of the cold vapor from the evaporator. As the process of evaporation continues the residue of the liquid refrigerating medium in the evaporator 8 collects in the narrow annular space between the jacket of the volume reducer 9 and the inner wall of the evaporator 8, where even the smallest volume contacts with a comparatively large surface of the evaporator, and is thus subjected to rapid evaporation.

What I claim is:—

A contrivance for improving the efficiency of absorption cooling machines working in two stages, comprising in combination an evaporator forming an irrigation cooler for liquids, a floating cylinder therein providing a narrow space between its side surface and that of the evaporator causing a rapid evaporation of the liquid, a boiler partly filled by an absorption medium and forming a vapor space therein, an absorption pipe located in said medium, a first conduit between said vapor space of the boiler and the upper part of the evaporator, a second conduit between said absorption pipe and the upper part of the evaporator, a valved connection between said two conduits, a vapor coil formed on the second conduit within the vapor space of the boiler, and a separator and a condenser in said first conduit outside the boiler and beyond said valve; whereby during the boiling period or first stage, with the valve set to open the first conduit and connect the vapor space of the boiler with said evaporator by way of said separator and condenser, vapor from the refrigerating medium is dried and liquefied before entering the evaporator where it becomes cooled; and during the second stage with the valve set to open the second conduit the cold vapor leaving the evaporator cooler is directed through the vapor space by way of said second conduit above the absorption medium prior to entering the absorption pipe in the boiler and thereby cools the still unabsorbed vapors in the absorber.

LOUIS STARK.